(12) United States Patent
Kim et al.

(10) Patent No.: US 7,545,626 B1
(45) Date of Patent: Jun. 9, 2009

(54) MULTI-LAYER CERAMIC CAPACITOR

(75) Inventors: Dae Hwan Kim, Gyunggi-do (KR); Tae Ho Song, Gyunggi-do (KR); Hyung Joon Kim, Gyunggi-do (KR); Jong Ho Lee, Gyunggi-do (KR); Chul Seung Lee, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/073,917

(22) Filed: Mar. 12, 2008

(51) Int. Cl.
*H01G 4/06* (2006.01)

(52) U.S. Cl. ............... 361/321.2; 361/321.1; 361/311; 361/313; 361/306.1; 361/306.3; 501/134; 501/138; 501/139

(58) Field of Classification Search ........... 361/321.1, 361/321.2, 321.4, 311–313, 306.1, 306.3, 361/301.1, 301.4; 501/134, 138–139
See application file for complete search history.

(56) References Cited

U.S. PATENT DOCUMENTS

| | | | |
|---|---|---|---|
| 5,668,694 A | 9/1997 | Sato et al. | |
| 5,805,409 A * | 9/1998 | Takahara et al. | 361/303 |
| 6,370,015 B2 * | 4/2002 | Noda et al. | 361/321.2 |
| 6,381,117 B1 * | 4/2002 | Nakagawa et al. | 361/306.3 |
| 6,493,207 B2 * | 12/2002 | Nakano et al. | 361/306.3 |
| 6,673,461 B2 * | 1/2004 | Chazono et al. | 428/469 |
| 6,853,536 B2 * | 2/2005 | Nakamura et al. | 361/321.4 |
| 6,903,919 B2 * | 6/2005 | Kayatani et al. | 361/321.2 |
| 7,006,345 B2 | 2/2006 | Nakano et al. | |
| 7,042,707 B2 * | 5/2006 | Umeda et al. | 361/321.2 |
| 7,075,775 B2 * | 7/2006 | Yamazaki | 361/306.3 |
| 2007/0195484 A1 | 8/2007 | Bultitude et al. | |

FOREIGN PATENT DOCUMENTS

| | | |
|---|---|---|
| EP | 1 553 605 A | 7/2005 |
| JP | 2000-340448 | 12/2000 |
| JP | 2004-031940 A | 1/2004 |
| JP | 2006-135141 A | 5/2006 |

OTHER PUBLICATIONS

European Search Report issued in European Patent Application No. 08251273.2-2214 dated on Oct. 23, 2008.
Partial European Search Report, with written opinion, issued in European Patent Application No. EP 08251273.2-2214 dated on Aug. 27, 2008.

* cited by examiner

*Primary Examiner*—Nguyen T Ha
(74) *Attorney, Agent, or Firm*—McDermott Will & Emery LLP

(57) ABSTRACT

A multi-layer ceramic capacitor including: a ceramic sintered body having cover layers provided on upper and lower surfaces thereof as outermost layers and a plurality of ceramic layers disposed between the cover layers; first and second internal electrodes formed on the ceramic layers, the first and second internal electrodes stacked to interpose one of the ceramic layers; first and second external electrodes formed on opposing sides of the ceramic sintered body to connect to the first and second internal electrodes, respectively; and anti-oxidant electrode layers formed between the cover layers and adjacent ones of the ceramic layers, respectively, the anti-oxidant electrode layers arranged not to affect capacitance.

12 Claims, 5 Drawing Sheets

MULTI-LAYER CERAMIC CAPACITOR

BACKGROUND OF THE INVENTION

1. Field of the Invention

The present invention relates to a multi-layer ceramic capacitor, more particularly, in which capacitance reliability is enhanced and defects such as electrical short and cracks are reduced.

2. Description of the Related Art

Of late, a smaller trend of electronic devices has led to a need for an ultra-capacity multi-layer ceramic capacitor. To this end, the multilayer ceramic capacitor is required to possess higher capacitance without increase in size. This necessitates a thinner ceramic layer, a thinner cover layer and a thinner internal electrode layer.

FIG. 1 is a side cross-sectional view illustrating an example of a conventional multi-layer ceramic capacitor.

Referring to FIG. 1, the multi-layer ceramic capacitor 10 includes cover layers provided on upper and lower surfaces thereof as outermost layers and a ceramic sintered body 11 having a plurality of ceramic layers disposed between the cover layers.

First and second internal electrodes 12a and 12b are arranged alternately between a corresponding one of the ceramic layers. First and second external electrodes 15a and 15b are formed on opposing sides of the ceramic sintered body 11 and connected to the first and second internal electrode 12a and 12b, respectively.

In this structure, to enhance capacitance of a capacitor without increase in size, the ceramic cover layers and internal electrodes 12a and 12b located at outermost portions need to be thinned. But this does not assure stable electrical properties of the internal electrodes 12a and 12b. Therefore, in order to allow for stable electrical properties of the internal electrodes while suppressing oxidation thereof, sintering should be performed at a reducing atmosphere where an oxygen partial pressure is regulated.

Sintering, when performed at such a reducing atmosphere having the oxygen partial pressure regulated, beneficially affects high-temperature reliability such as 150° C. IR characteristics. However, the outermost internal electrodes adjacent to the relatively thinner cover layers are observed to have been oxidized.

FIGS. 2A and 2B show electron probe micro analysis (EPMA) results analyzing mode of oxidization of the internal electrodes, which is caused by sintering at a reducing atmosphere having an oxygen partial pressure regulated, in manufacturing the conventional multi-layer ceramic capacitor.

With reference to the EPMA results of FIGS. 2A and 2B, oxide layers (indicated with "A" and "B") formed of an Mg—Ni—O phase are observed to have been formed on areas adjacent to the outermost portions of the internal electrodes containing e.g., Ni.

As described above, these oxide layers are formed by performing sintering at a reducing atmosphere where the oxygen partial pressure is regulated. The oxide layers trigger structural defects such as cracks in cover portions, i.e., cover cracks and deteriorates electrical properties. This as a result undermines reliability and yield of the multi-layer ceramic capacitor.

SUMMARY OF THE INVENTION

An aspect of the present invention provides a multi-layer ceramic capacitor having an anti-oxidization structure capable of preventing defects from arising due to oxidization of internal electrodes despite sintering at a reducing atmosphere where an oxygen partial pressure is regulated.

According to another aspect of the present invention, there is provided a multi-layer ceramic capacitor including: a ceramic sintered body having cover layers provided on upper and lower surfaces thereof as outermost layers and a plurality of ceramic layers disposed between the cover layers; first and second internal electrodes formed on the ceramic layers, the first and second internal electrodes stacked to interpose one of the ceramic layers; first and second external electrodes formed on opposing sides of the ceramic sintered body to connect to the first and second internal electrodes, respectively; and anti-oxidant electrode layers formed between the cover layers and adjacent ones of the ceramic layers, respectively, the anti-oxidant electrode layers arranged not to affect capacitance.

The anti-oxidant electrode layers may be formed of a material identical to materials for the first and second internal electrodes. Each of the anti-oxidant electrode layers has at least an oxidized portion.

The first and second internal electrodes and the anti-oxidant electrode layers each may be formed of an Ni layer. The oxidized portion of the anti-oxidant electrode layer may be an Mg—Ni—O phase Each of the anti-oxidant electrode layers may have a width identical to or greater than a width of the first and second internal electrodes, and the anti-oxidant electrode layers may be extended in a length direction not to contact first and second external electrodes, respectively.

The anti-oxidant electrode layers may be spaced apart from the first and second external electrodes at a distance of at least 5 μm, respectively.

Alternatively, each of the anti-oxidant electrode layers may be connected to a corresponding one of the external electrodes having an identical polarity to an adjacent one of the first and second internal electrodes. The anti-oxidant electrode layer may have an area identical to or greater than the adjacent one of the first and second internal electrodes, and the anti-oxidant electrode layer may be superimposed on the adjacent one of the first and second internal electrodes.

The anti-oxidant electrode layer may be spaced apart at a distance of at least 5 μm from a corresponding one of the first and second external electrodes not connected thereto.

The anti-oxidant electrode layers adjacent to the first and second internal electrodes, respectively may include a plurality of anti-oxidant electrode layers to further prevent oxidization.

Each of the cover layers may include $BaTiO_3$ and MgO, wherein MgO represents 0.5 mol or less with respect to 100 mol of $BaTiO_3$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 3:
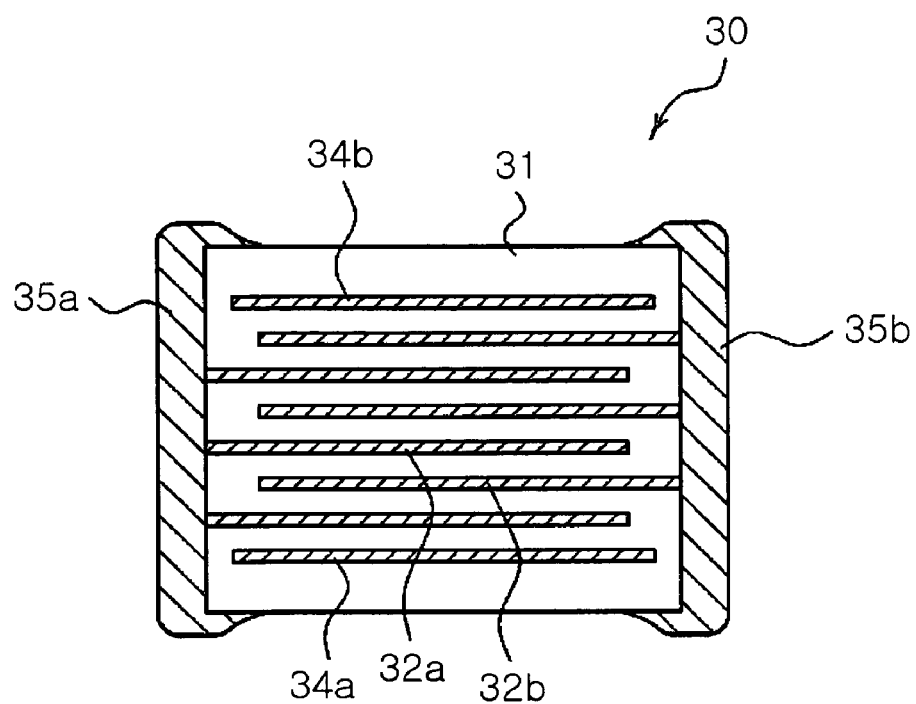
FIG. 3 is a side cross-sectional view illustrating a multi-layer ceramic capacitor according to an exemplary embodiment of the invention.

FIG. 3 is a side cross-sectional view illustrating a multi-layer ceramic capacitor according to an exemplary embodiment of the invention.

Referring to FIG. 3, the multi-layer ceramic capacitor 30 includes a ceramic sintered body 31 having first and second internal electrodes 32a and 32b.

Although not illustrated clearly in FIG. 3, the ceramic sintered body 31 is construed to include cover layers formed on upper and lower surfaces thereof as outermost layers and a plurality of ceramic layers disposed between the cover layers.

The ceramic sintered body 31 includes first and second external electrode 35a and 35b formed on opposing sides, and the first and second internal electrodes 32a and 32b are connected to the first and second external electrodes 35a and 35b, respectively while interposing a corresponding one of the ceramic layers therebetween.

The multi-layer ceramic capacitor 30 includes anti-oxidant electrode layers 34a and 34b disposed between the outermost layers (cover layers) and adjacent ceramic layers, respectively. As described above, the anti-oxidant electrode layers 34a and 34b prevent oxidization of the first and second internal electrodes located outermost when sintering is performed at a reducing atmosphere having an oxygen partial pressure regulated to control oxidization and electrical properties of the internal electrodes.

The anti-oxidant electrode layers 34a and 34b of the present embodiment are not connected to any of the first and second external electrodes 35a and 35b not to affect capacitance. In this case, to prevent oxidization more effectively, each of the anti-oxidant electrode layers 34a and 34b may have a width identical to or greater than a width of the first and second internal electrodes 32a and 32b, and may be extended in a length direction not to contact the first and second external electrode 35a and 35b. Here, even though not required in the present embodiment, the each anti-oxidant electrode layers 34a and 34b may be spaced apart at a distance of at least 5 μm from the first and second external electrodes 35a and 35b, respectively to prevent oxidization of the first and second internal electrodes 32a and 32b effectively and minimize their effect on the electrical properties.

The anti-oxidant electrode layers 34a and 34b of the present embodiment may be formed of a metal material, and particularly a metal identical to materials for the first and second internal electrodes 32a and 32b. Generally, the internal electrodes made of nickel are sintered at a reducing atmosphere having the oxygen partial pressure regulated. Here, the anti-oxidant electrode layers 34a and 34b may be made of nickel.

In fact, in the multi-layer ceramic capacitor 30 of the present embodiment, the anti-oxidant electrode layers 34a and 34b may remain partially oxidized in the sintering process. As described above, in a case where the anti-oxidant electrode layers 34a and 34b are formed of an Ni layer, oxidized portions thereof may exist as an Mg—Ni—O phase.

Meanwhile, to prevent the Mg—Ni—O phase from being formed in the first and second internal electrodes 32a and 32b except the anti-oxidant electrode layers 34a and 34b, the cover layers may be adjusted in ratio of minor components. That is, as a general example, in a case where the cover layers contain $BaTiO_3$ as a major component and MgO as a minor component, MgO may represent 0.5 mol or less with respect to 100 mol of $BaTiO_3$.

Figure 4A:
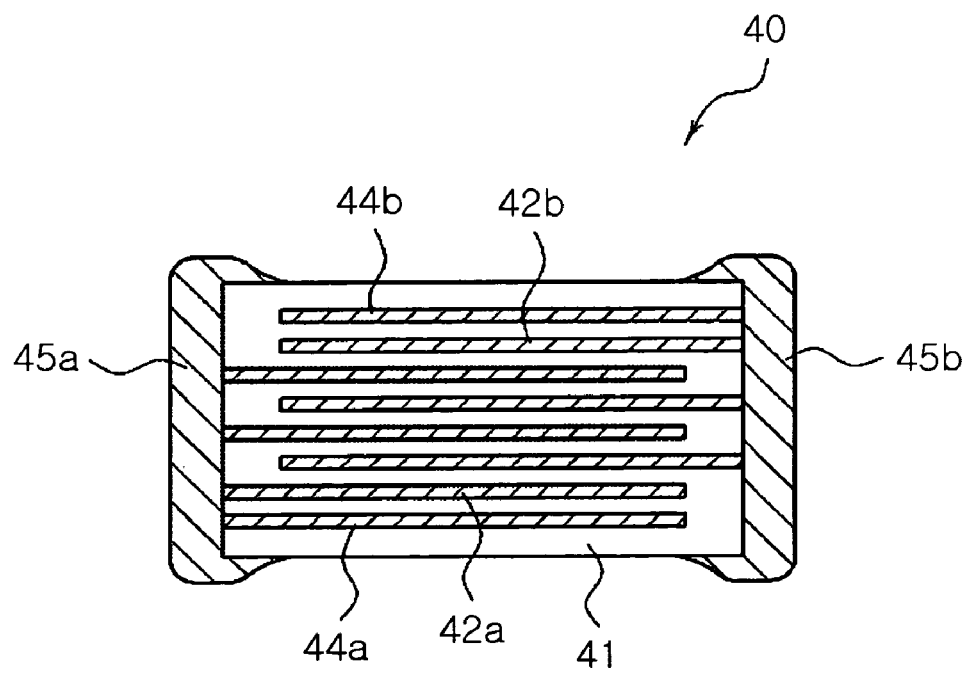
FIGS. 4A and 4B are a side cross-sectional view and an exploded perspective view illustrating a multi-layer ceramic capacitor structure, respectively according to an exemplary embodiment of the invention.
Figure 4B:
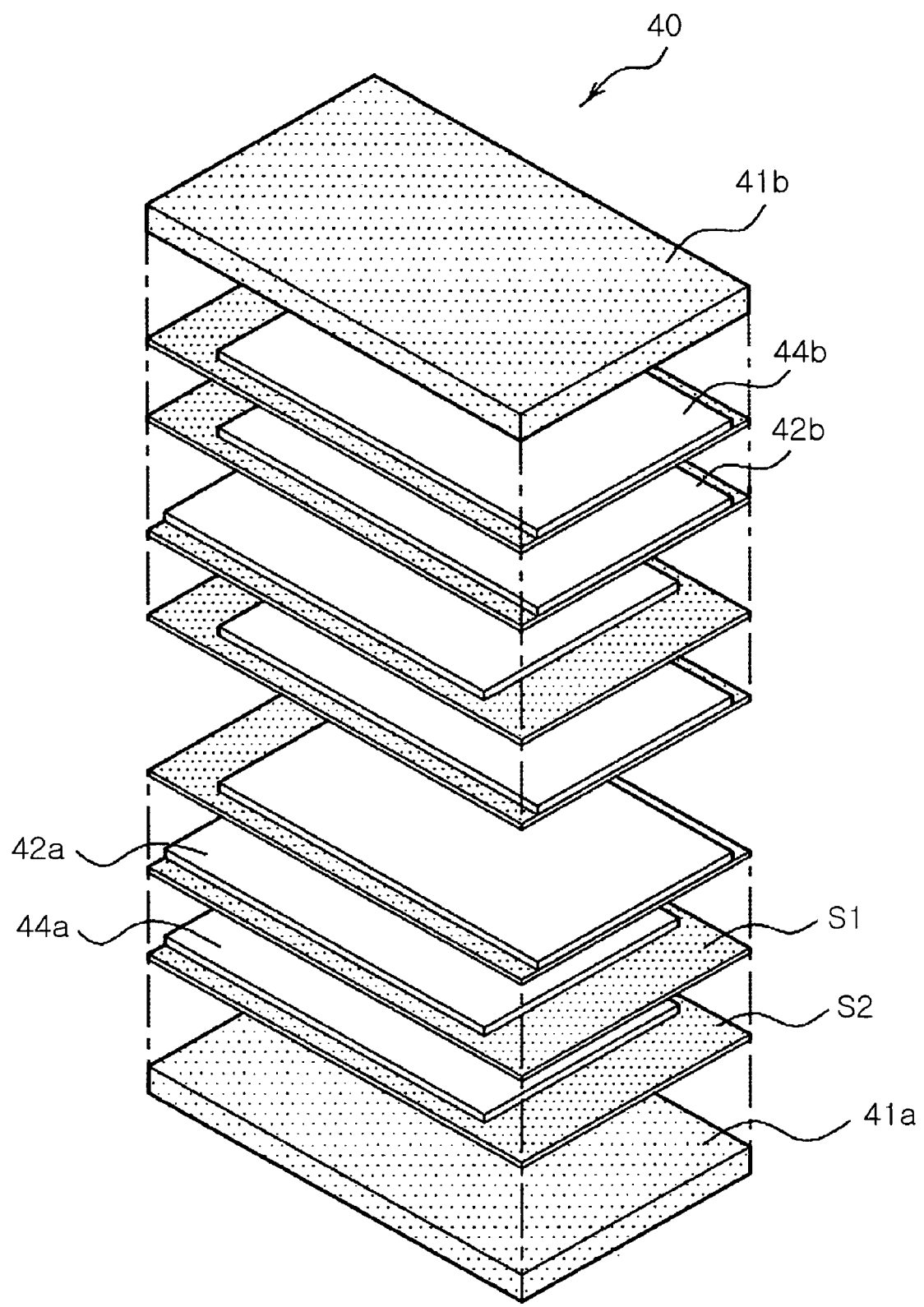

FIGS. 4A and 4B are a side cross-sectional view and an exploded perspective view illustrating a multi-layer ceramic capacitor structure, respectively according to an exemplary embodiment of the invention.

Referring to FIG. 4A, the multi-layer ceramic capacitor 40 includes a ceramic sintered body 41 having first and second internal electrode 42a and 42b.

As shown in the exploded perspective view of FIG. 4B, the ceramic sintered body 41 of FIG. 4A includes cover layers formed on upper and lower surfaces thereof as outermost layers, and a plurality of ceramic layers deposited between the cover layers. Also, the first and second internal electrodes 42a and 42b are arranged alternately while interposing a corresponding one of the ceramic layers to connect to the first and second external electrode 45a and 45b, respectively. The first and second internal electrodes 42a and 42b deposited to interpose the corresponding one of the ceramic layers is connected to the first and second external electrodes 45a and 45b formed on opposing sides, respectively, as shown in FIG. 4A.

Moreover, the multi-layer ceramic capacitor 40 includes cover layers 41a and 41b and anti-oxidant electrode layers 44a and 44b interposed between the cover layers 41a and adjacent ones of the ceramic layers, respectively.

As shown in FIG. 4A, each of the anti-oxidant electrode layers 44a and 44b of the present embodiment is connected to a corresponding one of the first and second external electrodes 45a and 45b having an identical polarity to an adjacent one of first and second internal electrodes, thereby not affecting capacitance. In this structure, as shown in FIG. 4, the each anti-oxidant electrode layer 44a and 44b may be formed with an area substantially identical to or greater than a corresponding one of the first and second internal electrodes to be protected, while substantially being superimposed on the corresponding internal electrode. This ensures the anti-oxidant electrode layers 44a and 44b to prevent oxidization more adequately.

The anti-oxidant electrode layer 44a and 44b may be spaced apart at a distance of at least 5 μm from an unconnected one (45b or 45a) of the first and second external electrodes to effectively prevent oxidization of the first and second internal electrodes 42a and 42b and minimize their effect on the electrical properties.

The anti-oxidant electrode layers 44a and 44b of the present embodiment may be formed of a metal material, and particularly a metal identical to materials for the first and second internal electrodes 42a and 42b. Also, as described with reference to FIG. 3, in the multi-layer ceramic capacitor 40 of the present embodiment, the anti-oxidant electrode layers 44a and 44b may remain partially oxidized in the sintering process. As described above, in a case where the anti-oxidant electrode layers 44a and 44b are formed of an Ni layer, oxidized portions thereof may exist as an Mg—Ni—O phase. This can be confirmed through following examples and FIGS. 5A and 5B.

In the embodiment shown in FIGS. 3 and 4A, one anti-oxidant electrode layer is employed in each corresponding location. However, the multi-layer ceramic capacitor may require greater anti-oxidation function depending on condition of the reducing atmosphere or thickness of the cover layers. Here, additional anti-oxidant electrode layers may be disposed after additionally providing additional ceramic layers adjacent to the internal electrodes located outermost, respectively. That is, a plurality of anti-oxidant electrode layers may be employed.

Hereinafter, operation and effects of the present invention will be described in greater detail by way of following examples.

INVENTIVE EXAMPLE

To confirm improved effects of anti-oxidant electrode layers of the present invention, 120 multilayer ceramic capacitors with a size of X5R 1.6 mm×0.8 mm and structured as shown in FIGS. 4A and 4B, i.e., having each of anti-oxidant electrode layers connected to a corresponding same polarity were designed to have a capacitance of 22 μF. Here, internal electrodes were formed of nickel and the anti-oxidant electrode layers were formed of nickel.

Figure 5A:
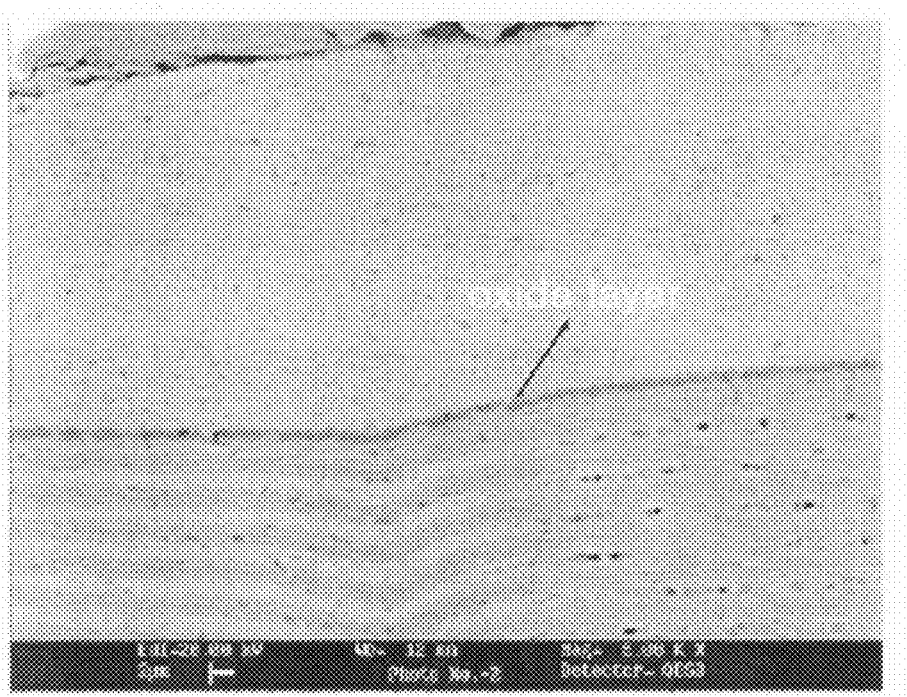
FIGS. 5A and 5B are scanning electron microscopy (SEM) pictures illustrating partial cross-section of different portions of a multi-layer ceramic capacitor structure manufactured according to an exemplary embodiment of the invention.
Figure 5B:
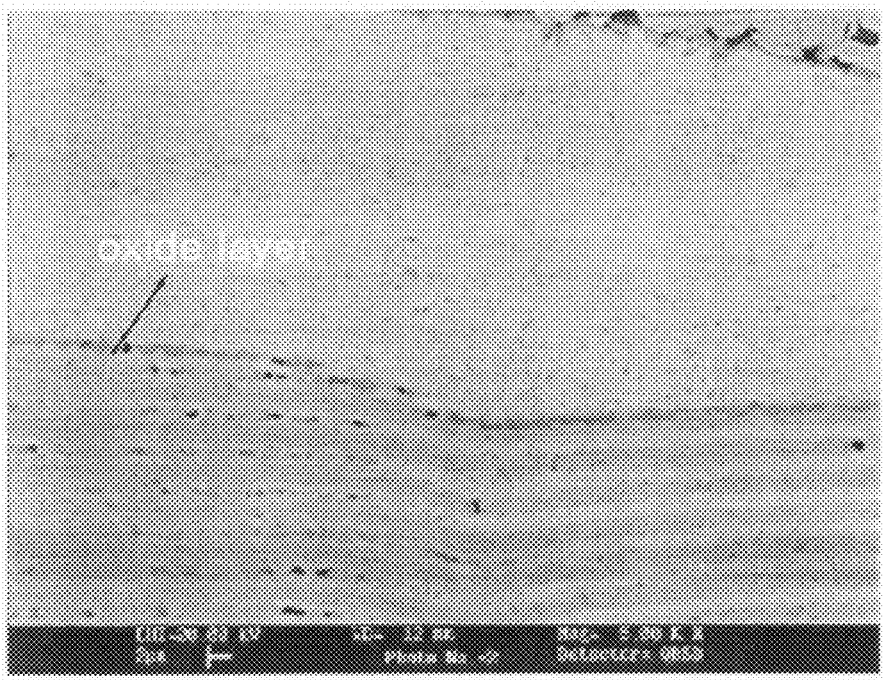

As described above, for the multilayer ceramic capacitors, sintering was performed at a reducing atmosphere having an oxygen partial pressure regulated. One of the completed multilayer ceramic capacitors was selected to have its crosssection SEM-photographed. FIGS. 5A and 5B are scanning electron microscopy (SEM) pictures illustrating cross-section of the multi-layer ceramic capacitor manufactured according to the present invention.

Referring to FIG. 5A, only the anti-oxidant electrode layer had an oxide layer partially formed thereon and the underlying one of the internal electrodes is observed not to have been oxidized. However, the oxide layer is slightly observed at a portion around an edge of the anti-oxidant electrode layer as in FIG. 5B. But this portion is a marginal area of the internal electrode, thus not directly influencing electrical properties such as capacitance.

COMPARATIVE EXAMPLE

Figure 1:
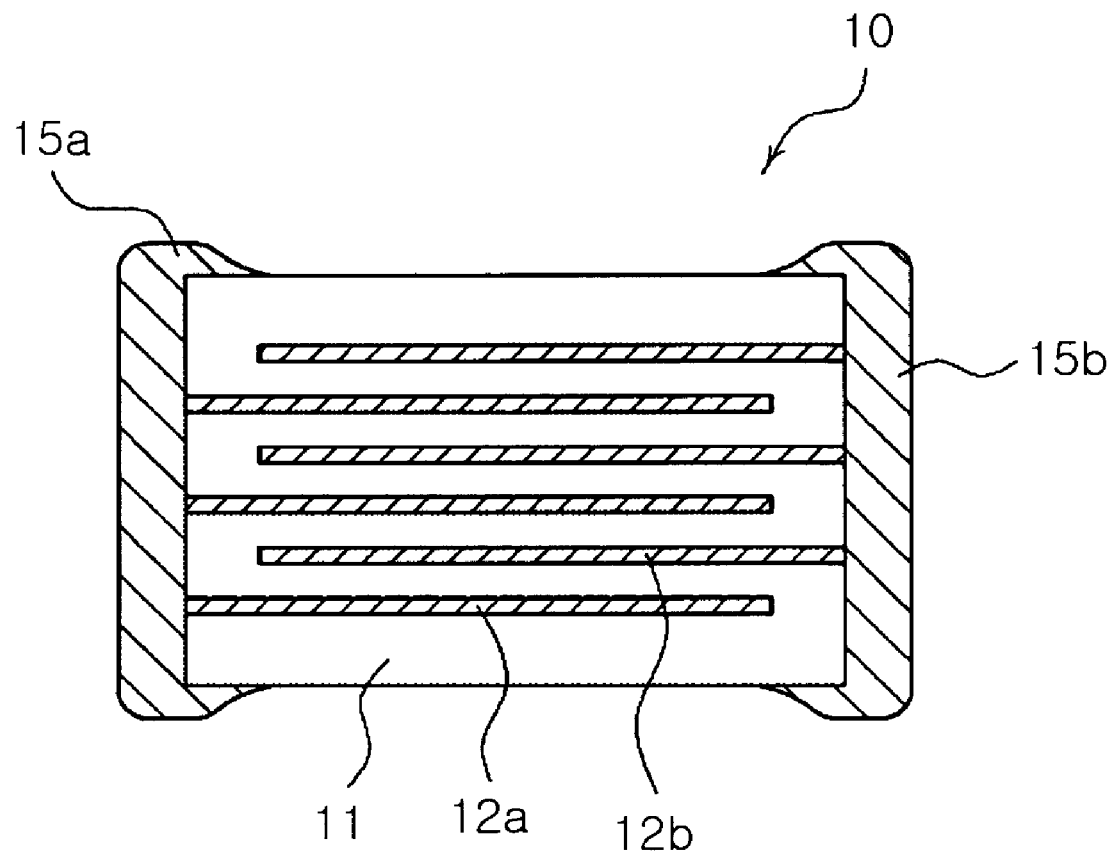
FIG. 1 is a side cross-sectional view illustrating a conventional multi-layer ceramic capacitor.
Figure 2A:
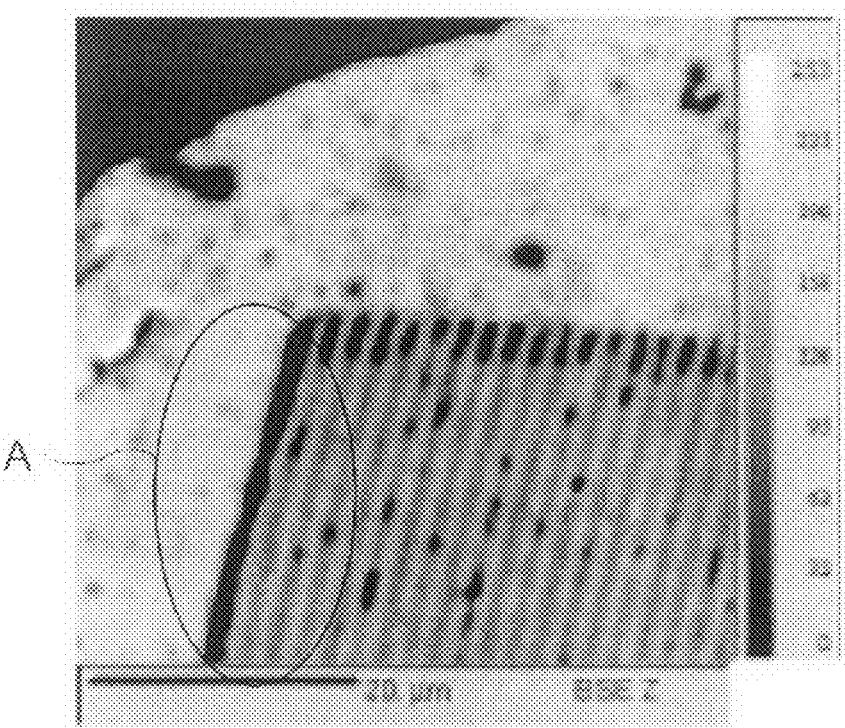
FIGS. 2A and 2B illustrate electron probe micro analysis (EPMA) results analyzing mode of oxidization of internal electrodes in the conventional multi-layer ceramic capacitor.
Figure 2B:
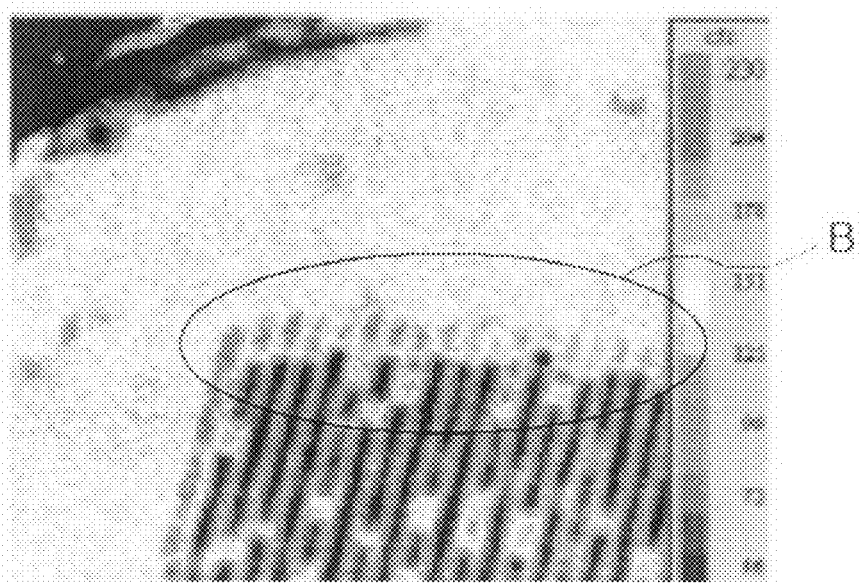

To confirm improved effects of the multilayer capacitor of the present invention, 120 multilayer chip capacitors with a conventional structure (shown in FIG. 1) were manufactured under the same design conditions as the above Inventive Example. However, here, each of the multi-layer chip capacitors is not provided with an anti-oxidant electrode layer connected to an external electrode of a polarity identical to an adjacent internal electrode. For the multilayer ceramic capacitors manufactured according to Comparative Example, sintering was performed at a reducing atmosphere having an oxygen partial pressure regulated under identical conditions to the Inventive Example.

The multilayer ceramic capacitors manufactured according to Inventive Example and Conventional Example were measured for capacitance and various defect rates such as short occurrence rate, flash defect rate, cover crack occurrence rate. The results are noted in Table 1 below.

TABLE 1

|  | Inventive Example | Comparative Example |
| --- | --- | --- |
| Capacitance | 22.2 μF | 21.9 μF |
| short occurrence rate | 6% | 16% |
| Flash defect rate | 20% | 75% |
| cover crack occurrence rate | 3% | 30% |

As can be seen in Table 1 above, the multilayer ceramic capacitor of Inventive Example is noticeably improved in short occurrence rate, flash defect rate and cover crack occurrence rate. Also, Inventive Example showed better capacitance than Comparative Example. This is because in Comparative Example, the internal electrodes are partially oxidized, thus failing to increase capacitance, while in Inventive Example, the internal electrodes contributive to capacitance are protected by the anti-oxidant electrode layers, thus free from oxidation-induced loss. As described above, the anti-oxidant electrode layers of Inventive Example ensure the internal electrodes to have stable electrical properties by at least 80% to thereby prevent decrease in capacitance.

As set forth above, according to exemplary embodiments of the invention, anti-oxidant electrode layers not affecting capacitance are disposed adjacent to outermost internal electrodes, respectively to dramatically lower defects resulting from oxidization of internal electrodes when sintering is performed at a reducing atmosphere having an oxygen partial pressure regulated in order to inhibit oxidization of the internal electrodes and enhance electrical properties thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-layer ceramic capacitor comprising:
   a ceramic sintered body having cover layers provided on upper and lower surfaces thereof as outermost layers and a plurality of ceramic layers disposed between the cover layers;
   first and second internal electrodes formed on the ceramic layers, the first and second internal electrodes stacked to interpose one of the ceramic layers;
   first and second external electrodes formed on opposing sides of the ceramic sintered body to connect to the first and second internal electrodes, respectively; and
   anti-oxidant electrode layers formed between the cover layers and adjacent ones of the ceramic layers, respectively, the anti-oxidant electrode layers arranged not to affect capacitance.

2. The multi-layer ceramic capacitor of claim 1, wherein the anti-oxidant electrode layers comprise a material identical to materials for the first and second internal electrodes.

3. The multi-layer ceramic capacitor of claim 2, wherein the first and second internal electrodes and the anti-oxidant electrode layers each comprise an Ni layer.

4. The multi-layer ceramic capacitor of claim 1, wherein each of the anti-oxidant electrode layers has at least an oxidized portion.

5. The multi-layer ceramic capacitor of claim 4, wherein the oxidized portion of the anti-oxidant electrode layer is an Mg—Ni—O phase.

6. The multi-layer ceramic capacitor of claim 1, wherein each of the anti-oxidant electrode layers has a width identical to or greater than a width of the first and second internal electrodes, and the anti-oxidant electrode layers are extended in a length direction not to contact first and second external electrodes, respectively.

7. The multi-layer ceramic capacitor of claim 6, wherein each of the anti-oxidant electrode layers is spaced apart from the first and second external electrodes at a distance of at least 5 μm, respectively.

8. The multi-layer ceramic capacitor of claim 1, wherein each of the anti-oxidant electrode layers is connected to a corresponding one of the external electrodes having an identical polarity to an adjacent one of the first and second internal electrodes.

9. The multi-layer ceramic capacitor of claim 8, wherein the anti-oxidant electrode layer is spaced apart at a distance of at least 5 µm from a corresponding one of the first and second external electrodes not connected thereto.

10. The multi-layer ceramic capacitor of claim 8, wherein the anti-oxidant electrode layer has an area identical to or greater than the adjacent one of the first and second internal electrodes, and the anti-oxidant electrode layer is superimposed on the adjacent one of the first and second internal electrodes.

11. The multi-layer ceramic capacitor of claim 1, wherein the anti-oxidant electrode layers adjacent to the first and second internal electrodes, respectively comprises a plurality of anti-oxidant electrode layers.

12. The multi-layer ceramic capacitor of claim 1, wherein each of the cover layers comprises $BaTiO_3$ and MgO,
wherein MgO represents 0.5 mol or less with respect to 100 mol of $BaTiO_3$.

* * * * *